United States Patent
Yoshizawa

(10) Patent No.: US 8,868,055 B2
(45) Date of Patent: Oct. 21, 2014

(54) METHOD FOR CONFIGURING A PLURALITY OF PARAMETERS IN A DEVICE

(75) Inventor: Takahito Yoshizawa, Boom (BE)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/499,795

(22) PCT Filed: Sep. 29, 2010

(86) PCT No.: PCT/EP2010/064506
§ 371 (c)(1),
(2), (4) Date: Jun. 21, 2012

(87) PCT Pub. No.: WO2011/039287
PCT Pub. Date: Apr. 7, 2011

(65) Prior Publication Data
US 2012/0252429 A1    Oct. 4, 2012

(30) Foreign Application Priority Data
Oct. 2, 2009   (EP) .................................... 09447048

(51) Int. Cl.
*H04M 3/00*  (2006.01)
(52) U.S. Cl.
USPC ..................... 455/418; 455/426.2; 455/432.1; 455/435.2; 455/436; 455/442

(58) Field of Classification Search
CPC . H04W 84/045; H04W 84/105; H04W 16/16; H04W 48/20; H04L 41/08; H04L 41/0803; H04L 41/0806
USPC ........................... 455/404.2, 429, 432.1–453, 455/456.1–456.3; 370/329–333
See application file for complete search history.

(56) References Cited

U.S. PATENT DOCUMENTS

| | | |
|---|---|---|
| 6,141,565 A | 10/2000 | Feuerstein et al. |
| 7,929,970 B1 * | 4/2011 | Gunasekara et al. .......... 455/444 |
| 2004/0223477 A1 * | 11/2004 | Iwasaki et al. ................ 370/338 |
| 2007/0025306 A1 | 2/2007 | Cox et al. |
| 2008/0298275 A1 * | 12/2008 | De Sousa ...................... 370/255 |
| 2009/0047945 A1 | 2/2009 | Zhang et al. |
| 2009/0316649 A1 * | 12/2009 | Chen ............................. 370/331 |
| 2010/0184423 A1 * | 7/2010 | Kent et al. .................. 455/422.1 |

* cited by examiner

*Primary Examiner* — Dai A Phuong
(74) *Attorney, Agent, or Firm* — Robert D. Shedd; Sammy S. Henig

(57) ABSTRACT

The present invention concerns a cellular device access point device and a method at a cellular access point device for configuring a set of parameters at the cellular access point device comprising receiving and storing a set of identifiers and a set of parameters values, each identifier corresponding to a different set of parameters values, receiving, from a cellular management system, an identifier corresponding to an environment where the cellular access point device is located, and setting the parameter to the values corresponding to the identifier.

6 Claims, 5 Drawing Sheets

METHOD FOR CONFIGURING A PLURALITY OF PARAMETERS IN A DEVICE

This application claims the benefit, under 35 U.S.C. §365 of International Application PCT/EP2010/064506, filed Sep. 26, 2010, which was published in accordance with PCT Article 21(2) on Apr. 7, 2011 in English and which claims the benefit of European patent application No. 09447048.1, filed Oct. 2, 2009.

FIELD OF THE INVENTION

The present invention relates generally to device configuration and in particular to femtocell access point device configuration.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

A macrocell is a cell in a mobile phone network that provides radio coverage served by a cellular base station, namely a NodeB in a universal mobile telecommunication system (UMTS) network, also called a macro base station. It is adapted to connect cellular handsets, also called User Equipment or UE, to a mobile network. The area covered by a base station is called a coverage area. When a UE is located in a cell, it can connect to the base station.

A femtocell, also called an access point base station, a Home Node B or a femto base station, is a small cellular base station that is installed in the indoor environment. A femtocell is adapted to cover a much lower cell range than a macrocell. The cell size covered by a femtocell is also called a femtocell hereinafter. A typical use of a femtocell is inside a building to cover areas that are not reached by a macrocell. A mobile operator provides a plurality of macrocells and femtocells. A femtocell base station is functionally similar to a macro base station. It transmits and receives cellular radio signal to/from the mobile handset, and communicates to the mobile network. As such, the femtocell needs to be configured and managed by the mobile operator.

The configuration items for the macro base stations includes very detailed and specific items, including radio physical layer and radio resource control related information. The radio resource control configuration is specified in the 3GPP 25.331 standard, version 8.7.0 (2009-06) on 3rd Generation Partnership Project; Technical Specification Group Radio Access Network; Radio Resource Control (RRC); Protocol Specification (Release 8), and noted 25.331 or RRC specification hereinafter.

That information determines the behavior of the base station. The femtocell being also a cellular base station, it requires the same set of configuration items for the proper operation.

In the traditional macrocell, the total number of the cells the mobile operator manages is relatively small, in order of hundreds to a few thousands depending on the system size. On the other hand, the number of managed femtocells is higher, in the order of millions, due to the nature of being a consumer CPE device with small coverage to be deployed in the indoor environment. This number of managed femtocells renders the configuration much more complex for the mobile operator.

SUMMARY OF THE INVENTION

The present invention attempts to remedy at least some of the concerns connected with the prior art, by providing a management system adapted to the femtocell environments.

The present invention concerns a method for optimizing the configuration of a plurality of parameters at a device. It applies notably to the field of cellular access points such as femtocells or macrocells.

To this end, the invention relates to a method at a cellular access point device for configuring a set of parameters at the cellular access point device comprising receiving and storing a set of identifiers and a set of parameters values, each identifier corresponding to a different set of parameters values, receiving, from a cellular management system, an identifier corresponding to an environment where the cellular access point device is located, and setting the parameter to the values corresponding to the identifier.

The invention simplifies the long configuration process of a device, requiring setting the value of a plurality of parameters one by one. Instead of receiving the set of parameters with multiple transmissions from a remote device, the reception of only one identifier permits the device to set the values of the parameters.

According to an embodiment of the invention, prior to receiving an identifier, the method comprises the step of providing information on the device environment to a management system of a mobile operator.

Advantageously, the parameter values selection depends on the environment where the device is located.

According to an embodiment of the invention, the device environment is the location area of the device, and the set of values correspond to the cellular access point device density in the area.

According to an embodiment of the invention, the set of parameters is the Radio Frequency parameters of the cellular access point device radio interface.

According to an embodiment of the invention, the set of parameters are the Radio Resource Control parameters of the cellular access point device radio interface.

According to an embodiment of the invention, the parameters are adapted to configure the handover behavior at the cellular access point device.

According to an embodiment of the invention, the method comprises a step of receiving an identifier occurring after initialization of the device.

According to an embodiment of the invention, the method comprises the steps of receiving and storing at least one second identifier and at least one second set of parameters values, the at least one second identifier corresponding to a different set of second set of the at least one parameters values, and updating the previously stored set of identifiers and set of parameters.

Advantageously, the set of parameters may be updated any time.

The invention also cellular access point device comprising configuring means for receiving a set of identifiers and a set of parameters values, each identifier corresponding to a different set of parameters values, receiving an identifier corresponding to an environment where the cellular access point device is located, and configuring the device with the parameter values corresponding to the identifier.

According to an embodiment of the invention, the device comprises an environment indicating means for providing information on the device environment to a management system of a mobile operator.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which:

In FIG. 2, the represented blocks are purely functional entities, which do not necessarily correspond to physically separate entities. Namely, they could be developed in the form of hardware or software, or be implemented in one or several integrated circuits.

DETAILED DESCRIPTION OF PREFERRED EMBODIMENTS

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modifications known to those skilled in the art.

The exemplary embodiment comes within the framework of cellular communication systems, but the invention is not limited to this particular environment and may be applied within other frameworks where a device receives a plurality of configuration parameter values from a remote device, and where the values depend on the device environment.

Figure 1:
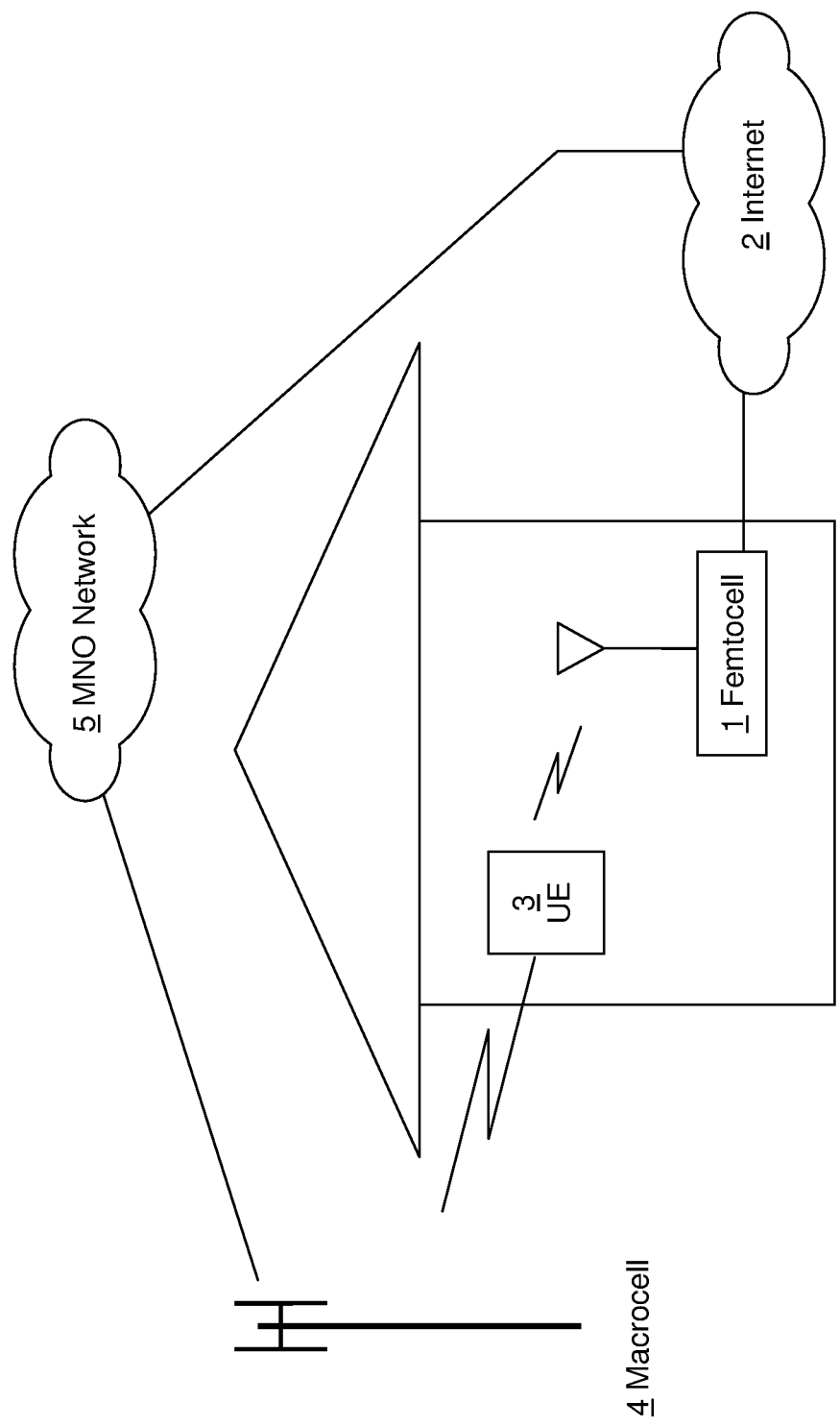
FIG. 1 represents a system according to the embodiment.

The present embodiment concerns a femtocell in a system as illustrated in FIG. 1. The femtocell 1 is connected to the service provider network, also called the mobile network operator network 5, through a broadband connection. In the embodiment, the broadband connection is a digital subscriber line connection that provides connection to the Internet 2. The femtocell 1 located in the home environment is connected to the Internet 2 through a digital subscriber line gateway not represented. The femtocell device is a standalone device. Of course the femtocell might also be embedded in such a gateway. The femtocell enables to connect a UMTS compatible user equipment 3, noted UE hereinafter. When connected to the femtocell, the UE accesses the Mobile Network Operator (MNO) network through the Internet. The UE 3 may also be connected to the MNO network through a macrocell 4 in a manner well known per se. Only one UE is represented, but the femtocell is of course adapted to connect a plurality of UEs.

Figure 2:
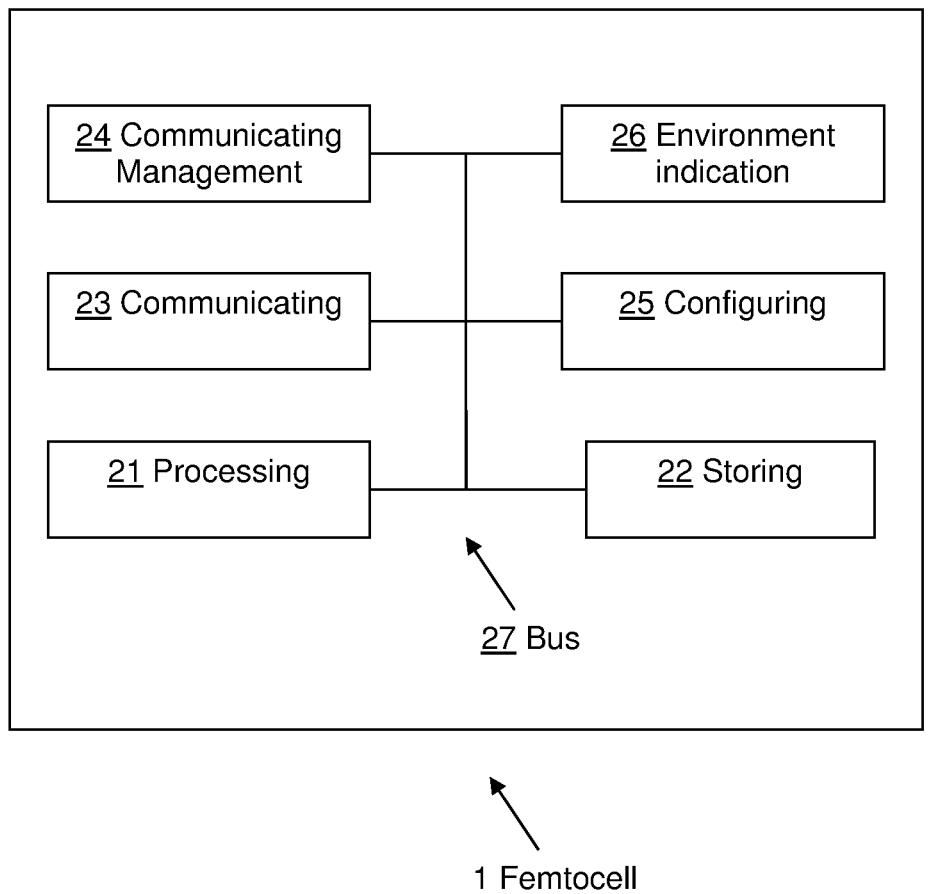
FIG. 2 depicts a femtocell device according to the embodiment.

The femtocell device according to the embodiment is represented in FIG. 2. It comprises a communicating module 23 for emitting and receiving in the UMTS network. In particular the communicating module 23 is a 3G radio emitter-receiver. More generally, this is a mobile networking interface. A communicating management module 24 is adapted to perform the management and control functions of the communicating module 23. The femtocell also comprises a broadband communication module, not represented, for communicating to the broadband network. The femtocell device also comprises storing module 22 such as a memory for storing among others the list of UE identifiers as indicated hereinafter. The femtocell device also comprises a processor 21 that is adapted to execute the algorithm of the embodiment. The modules are interconnected through an internal bus 27.

The femtocell according to the embodiment comprises a configuring module 25 adapted to configure the parameters of the femtocell according to the method described hereinafter. In particular it sets the physical and RRC parameters to the values indicated by the management system. The femtocell according to the embodiment also comprises an environment indication module 26 that is adapted to identify the environment type where the femtocell is located. In variant embodiments, the femtocell doesn't comprise an environment indication module.

The configuration items in the UMTS macrocell base stations include information type such as RF specific parameters such as defined in Layer 2 Radio Resource Control (RRC) specification. Typically, these RF specific parameters consist of numerous individual parameters, each of which defines a very specific and concrete meaning and definition to drive the UE behavior under the cell, such as radio channel number and threshold values to determine handover behavior by the UE.

The configuration according to the embodiment is presented hereinafter. A mobile operator that provides femtocell services divides the geographical region and allocates different set of RF parameters for each one of these regions. For example, province A and province B may be assigned with the RF parameters for femtocell configuration indicated in the following table.

TABLE 1

| Parameter type | Value for province A (parameter set handle "A") | Value for province B (parameter set handle "B") |
|---|---|---|
| Frequency (UARFCN) | 123 | 456 |
| Starting value for the primary scrambling code (PSC) for P-CPICH | 8 | 16 |
| Number of primary scrambing code (PSC) for P-CPICH | 5 | 10 |

If a femtocell is located within the province A, then the management system provides the "handle" for this parameter set (called handle name="A") to the femtocell during the configuration. When the femtocell receives this A value, it translates this "handle" to the actual set of parameter values to apply and configure the RF parameters. This way, the usage of "handle" provides a simplified mechanism to configure the femtocell instead of transferring numerous individual parameters to the femtocell.

The set of values corresponding to each handle has of course previously been recorded at the femtocell. In other words, the femtocell maintains the table 1 in memory. On reception of the handle value, it applies the corresponding parameters. Of course, the set of values can be updated anytime by the management system.

Figure 3:
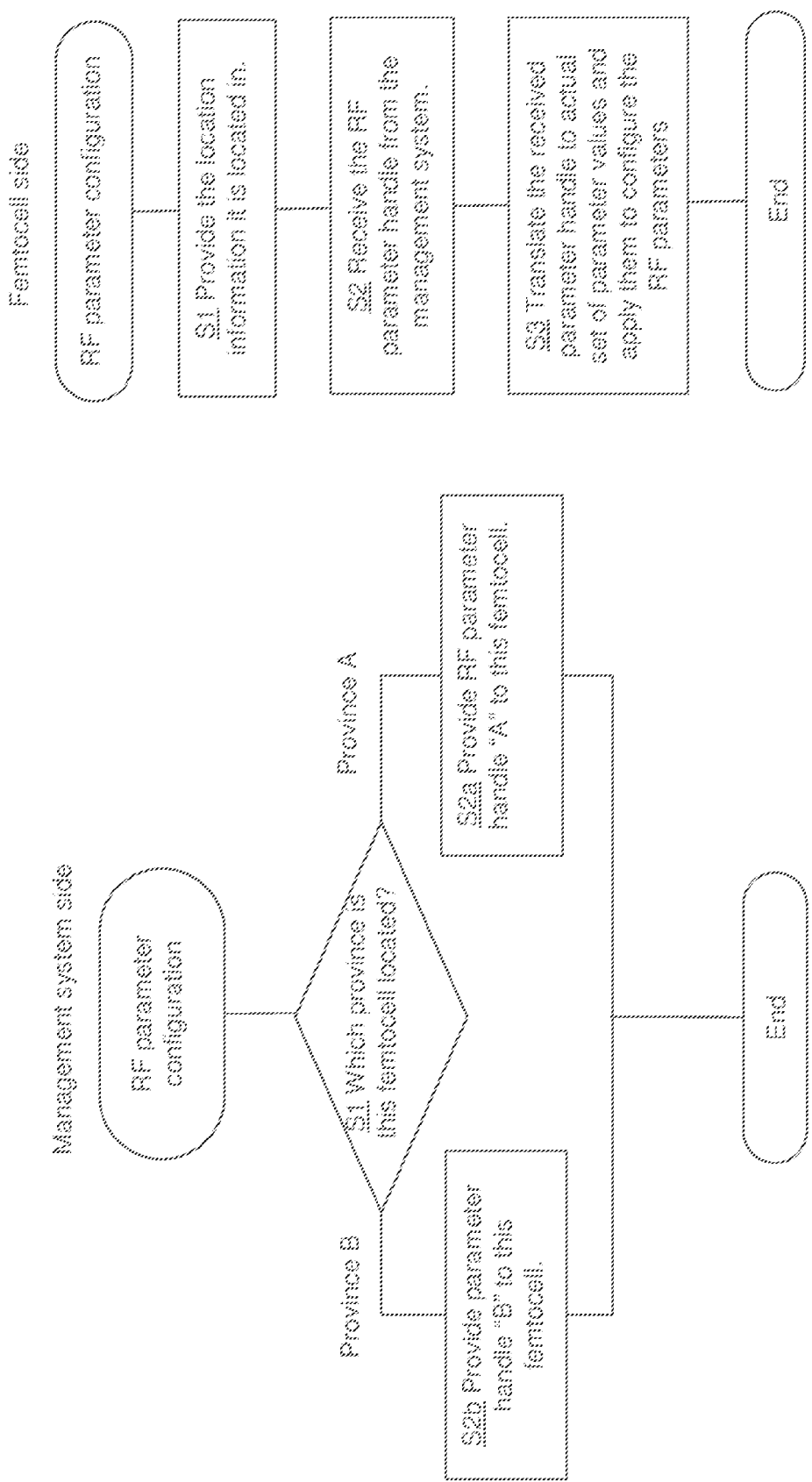
FIG. 3 is a flow chart of the RF configuration according to the embodiment.

The flowcharts in FIG. 3 illustrate this mechanism, a first one for the management system side and another one for the femtocell side.

In step S1, management system queries the location information where the femtocell is located in; this may be either dynamically discovered information such as a GPS receiver, or pre-provided subscription information such as owner's street address. In the former case this is performed at the environment indication module 26 of the femtocell. This information is provided to the management system when the femtocell is installed. In the latter case, the femtocell doesn't comprise any environment management module; the environment information is provided to the management system prior or independently to the installation of the femtocell. Alternatively, it is provided through a mobile device connected to the femtocell. When a mobile device connects to the femtocell, the management system obtains information on the location of the mobile device and subsequently to the location of the femtocell.

In step S2, S2a, S2b, the management system provides the RF parameter handle that corresponds to the location of this femtocell.

In step S3, the femtocell translates the received handle name to the actual set of RF parameters values using the information of table 1. If the femtocell receives the handle A, it sets the values 123, 8 and 5 to the parameters indicated in the table 1 respectively.

Alternatively, instead of sending the RF parameter handle, the management system sends the list of parameter values to the femtocell.

In particular, the management system communicates the handles or the values to the femtocell through the broadband connection.

In particular, the different sets of parameters and handles values are sent to the femtocell prior to the step S1. They are stored in the femtocell before the femtocell is provided to an end user. They can also be updated when the femtocell is running. The management system may provide updated values. It may also provide an updated set of handles, comprising more or less handle values.

The mobile operator also configures the layer 2 level information specific to RRC protocol. RRC protocol configuration includes protocol timers to control the handover behavior between cells.

One of the usages and applications for this present embodiment can be as follows. Femtocells can be deployed in a densely populated area such as in the center of a big city, in a suburban area where it is less dense, or very sparsely populated area such as country side. Depending on the situation where the femtocell is located in, the handover behavior is likely set differently for optimal user experience. For example, in the densely populated case, it is not desirable if a handover occurs too easily or too frequently simply because there is another better cell available in the vicinity. Due to charging reasons a user's handset should be connected to his or her own femtocell, rather than somebody else's femtocell or nearby macrocell even if the signal quality of his or her own femtocell may not be optimal compared to the surrounding cells. On the other hand, in the very sparsely populated area where only a few distant macrocells are present, the handover behavior may not be as stringent as the densely populated area. The decision process for handover is called reselection.

The table below shows an example of the set of specific parameter values for handover (cell reselection) behavior. The exact definition of the parameters are defined in the 25.331 standard and not detailed here. Of course, the values shown in this table is for illustration purpose only and in no way have any significance in the actual deployment consideration.

| Parameter type | Value for dense area (parameter set handle "C") | Value for less dense area (parameter set handle "D") | Value for very sparse area (parameter set handle "E") |
| --- | --- | --- | --- |
| QqualMin (dB) | −24 | −15 | 0 |
| QqualMinOffset (dB) | 16 | 10 | 1 |
| QrxLevMin (dBm) | −115 | −70 | −25 |
| QrxLevMinOffset (dB) | 16 | 8 | 2 |
| TReselections (sec) | 30 | 15 | 5 |
| SIntrasearch (dB) | 20 | 0 | −20 |
| Sintersearch (dB) | 10 | 0 | −32 |
| SsearchRAT (dB) | 10 | 0 | −32 |

The management system queries the femtocell regarding the area it is located in. Based on this information, the management system determines which handover parameters are most appropriate and should be configured for this particular femtocell. The management system provides the "handle" for this parameter set, the handle name="C" for densely populated area. When the femtocell receives this value, it translates this "handle" to the actual set of parameter values to apply and configure the handover related parameters.

Figure 4:
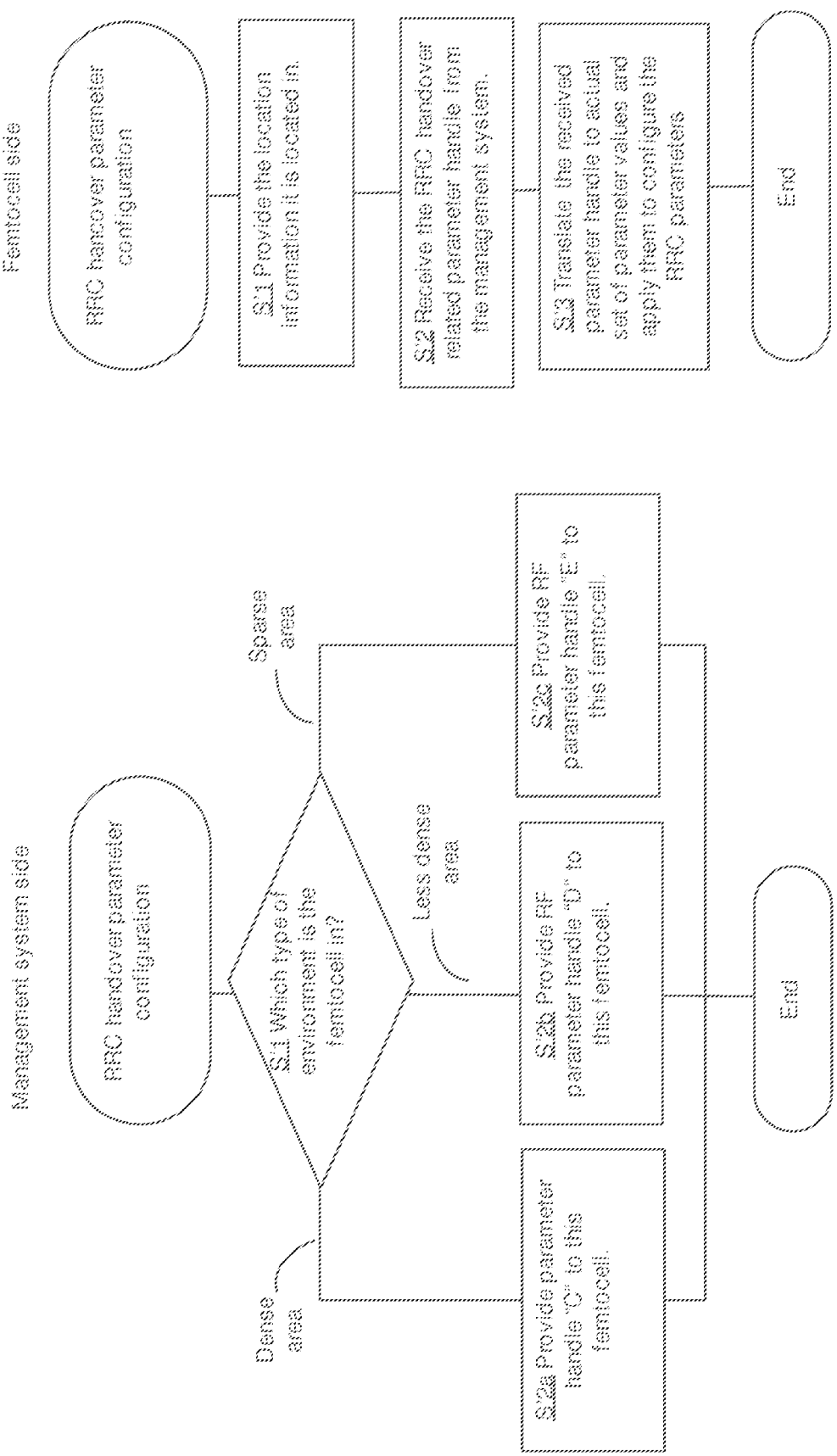
FIG. 4 is a flow chart of the Radio Resource Control configuration according to the embodiment.

Two flowcharts shown in FIG. 4 illustrate this mechanism, a first one for the management system side and another one for the femtocell side.

In step S'1, management system queries the location information where the femtocell is located in. In particular the femtocell provides information that permits the management system to define the femtocell environment area. This is performed at the environment indication module 26. Alternatively, the femtocell doesn't comprise any environment management module; the environment information is provided to the management system prior or independently to the installation of the femtocell.

In step S'2, S'2a, S'2b, and S'2c, management system provides the RRC handover related parameter handle that is more appropriate for the location of this femtocell.

In step S'3, femtocell translates the received handle name to the actual set of RRC handover related parameters using the information shown in table 2 in the preceding page. This mapping action is similar to the one shown in FIG. 3.

The configuration method of the embodiment also applies to the Layer 3 Radio Access Network Application Protocol (RANAP) specific parameters.

More generally, the traditional macrocell configuration parameters are aggregated into a higher level set. Multiple related parameters are grouped together to define a coherent set of parameter "set." A "name" is given to this group to collectively represent the set of parameter with associated values. This "name" is used as a short-hand notation to represent a specific parameter set and their associated combination of values. More than one such group is defined with different combinations of values.

By defining a multiple of such "sets" of same parameters but different value combinations, the management system aggregates a large number of parameters into a smaller group of parameter combination sets. The femtocell management system can select one of the multiple sets from the group to apply for a given femtocell for configuration purpose. This selection of a set can be done for the initial configuration of the femtocell, as well as the ongoing management of the femtocell if the management system decides to change the configuration.

Figure 5:
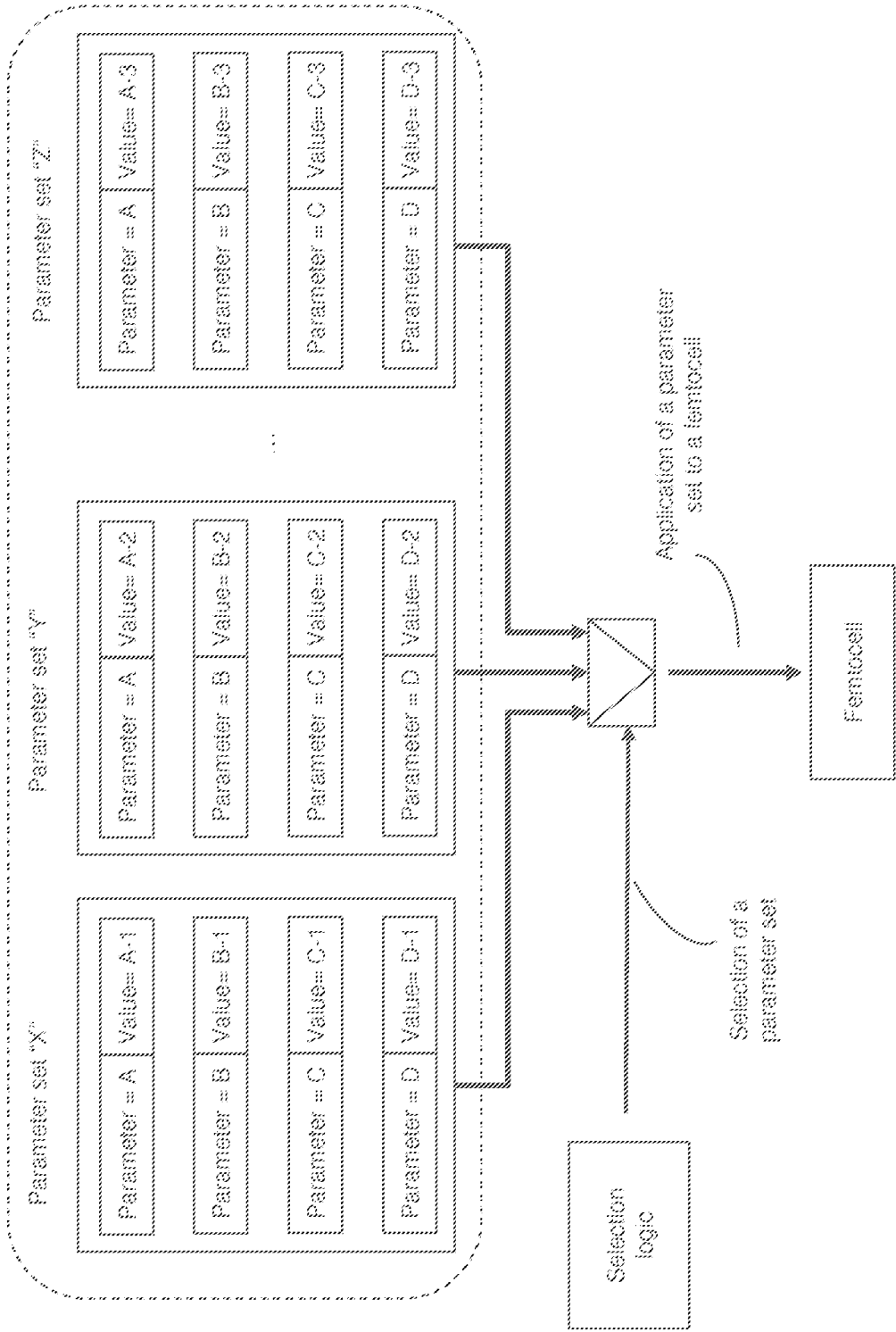
FIG. 5 represents the selection process according to the embodiment.

The parameter sets are illustrated in FIG. 5. The representation of values, such as "A-1", "A-2", "B-1", "B-2", are representation of actual values. Depending on the actual setting of the values, the parameter set "X" and set "Y" can be made to be very different, or very similar but only slightly different. This way, varying level of granularity can be achieved based on how similar or different the given sets are. Also, there can be multiple sets of the same parameters. By defining either a few or many sets of the same parameters but different value combinations, it is possible to define either fine or coarse configuration possibilities in different "grades" or "shades of colors" in configuration. The varying degree of granularity can be applied to account for varying type of deployment environment, such as densely populated city, sparsely populated country side, flat terrain, mountainous terrain for optimal coverage and user experience.

As illustrated in FIG. 5, the mobile operator selects a parameter set among the parameter sets available X, Y and Z. From that selection, the femtocell device applies the corresponding parameters. If the mobile operator selects the parameter set X, the femtocell device set the parameter to the values corresponding to that set. The selection at the mobile operator is based on the location or the environment of the femtocell device.

The values, the number of parameters in a set, and the number of sets can be updated any time. On reception of an update, the femtocell updates the current and stored values accordingly.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. A method for configuring a cellular access point device, said cellular access point device comprising:
   storing multiple sets of values, each set of values corresponding to a set of Radio Frequency handover related parameters and being adapted to configure the handover behavior at said cellular access point device, each set of values being identified by an identifier;
   receiving an identifier from a cellular management system, said identifier corresponding to one of said sets of values stored at said cellular access point device, said set of values corresponding the environment area where said cellular access point device is located; and
   applying said set of values corresponding to said identifier to the cellular access point device, so that said cellular access point uses said values in operation, wherein a Radio Resource Control includes protocol timers to control the handover behavior between cells.

2. Method according to claim 1, comprising, prior to receiving the identifier, providing information on the environment where said cellular access point device is located to a management system of a mobile operator, said identifier corresponding to said environment.

3. Method according to claim 2, the environment where said cellular access point device is located being the location area of said device, and said set of values corresponding to the cellular access point device density in said area.

4. Method according to claim 1, further comprising receiving an update of a set of values.

5. Cellular access point device comprising:
   a memory for storing multiple sets of values each set of values corresponding to a set of Radio Frequency handover related parameters and being adapted to configure the handover behavior at said cellular access point device, each set of values being identified by an identifier, and
   a configuring module for:
   receiving an identifier from a cellular management system, said identifier corresponding to a set of values stored at said cellular access point device, said set of values corresponding the environment area where said cellular access point device is located, and
   applying said set of value corresponding to said identifier to configure the cellular access point device, so that said cellular access point uses said values in operation, wherein a Radio Resource Control includes protocol timers to control the handover behavior between cells.

6. Cellular access point device according to claim 5, comprising an environment module for providing information on the environment where said cellular access point device is located to a management system of a mobile operator, said identifier corresponding to said environment.

* * * * *